(12) United States Patent
Hazama et al.

(10) Patent No.: US 6,771,260 B1
(45) Date of Patent: Aug. 3, 2004

(54) SKETCHER

(75) Inventors: Kensuke Hazama, Yorba Linda, CA (US); Dmitry Leshchiner, Irvine, CA (US); Edward Schwalb, Irvine, CA (US); Vincent Nguyen, Santa Ana, CA (US)

(73) Assignee: Amada Company, Limited, Kanagawa-Ken (JP)

( * ) Notice: Subject to any disclaimer, the term of this patent is extended or adjusted under 35 U.S.C. 154(b) by 0 days.

(21) Appl. No.: 09/459,577

(22) Filed: Dec. 13, 1999

(Under 37 CFR 1.47)

(51) Int. Cl.[7] ............................................. G06T 17/00
(52) U.S. Cl. ..................................................... 345/420
(58) Field of Search ................................. 345/419, 420

(56) References Cited

U.S. PATENT DOCUMENTS

| | | | |
|---|---|---|---|
| 5,278,983 A | | 1/1994 | Kawabe et al. |
| 5,414,801 A | * | 5/1995 | Smith et al. .................. 345/419 |
| 5,537,519 A | * | 7/1996 | Vossler et al. ............... 345/420 |
| 5,587,914 A | * | 12/1996 | Conradson et al. ........... 700/95 |
| 5,701,403 A | | 12/1997 | Watanabe et al. |
| 5,812,137 A | * | 9/1998 | Kerker et al. ................ 345/420 |
| 5,815,154 A | | 9/1998 | Hirschtick et al. |
| 5,850,535 A | | 12/1998 | Maystrovsky et al. |
| 5,886,897 A | | 3/1999 | Hazama et al. |
| 6,016,147 A | * | 1/2000 | Gantt ........................... 345/420 |
| 6,212,441 B1 | * | 4/2001 | Hazama et al. ............... 700/98 |
| 6,219,049 B1 | * | 4/2001 | Zuffante et al. ............. 345/764 |
| 6,219,055 B1 | * | 4/2001 | Bhargava et al. ............ 345/850 |
| 6,308,144 B1 | * | 10/2001 | Bronfeld et al. ................ 703/2 |
| 6,337,685 B2 | * | 1/2002 | Nagakura ..................... 345/419 |
| 6,542,937 B1 | * | 4/2003 | Kask et al. ................... 719/328 |

FOREIGN PATENT DOCUMENTS

| | | |
|---|---|---|
| EP | 0187065 | 7/1986 |
| EP | 0361787 | 4/1990 |
| EP | 0768624 | 4/1997 |

OTHER PUBLICATIONS

English Language Abstract of EP 0 187065.
SPI GmbH, "Sheetmetal Desktop 3.01", Ahrensburg, Germany, published 1998, (http://www.spi.de/sheetmet/sm-1.htm).
SPI GmbH, "SheetmetalWorks 98Plus", Ahrensburg, Germany, published 1998, (http://www.spi.de/metalworks/smw_eng.htm).
SPI GmbH, "Sheetmetal AutoCAD 2000", Ahrensburg, Germany, published 1999, (http://www.spi.de/sheetmet/sma.htm).

* cited by examiner

*Primary Examiner*—Mark Zimmerman
*Assistant Examiner*—Enrique L Santiago
(74) *Attorney, Agent, or Firm*—Greenblum & Bernstein, P.L.C.

(57) ABSTRACT

A method, a system, and a computer program for graphically editing a computer generated sheet metal part model initially display the sheet metal part model on a computer display screen. The method, system, and computer program then select an entity of the sheet metal part model to edit, and select an editing operation to be performed on the selected entity. The method, system, and computer program also include performing the selected editing operation on the selected entity, and modifying the sheet metal part model in accordance with the performed editing operation. Finally, the method, system, and computer program display the modified sheet metal part model on the computer display screen so that a user views modifications of the sheet metal part model in real time.

21 Claims, 11 Drawing Sheets

(a)  (b)  (c)  (d)  (e)  (f)  (g)  (h)

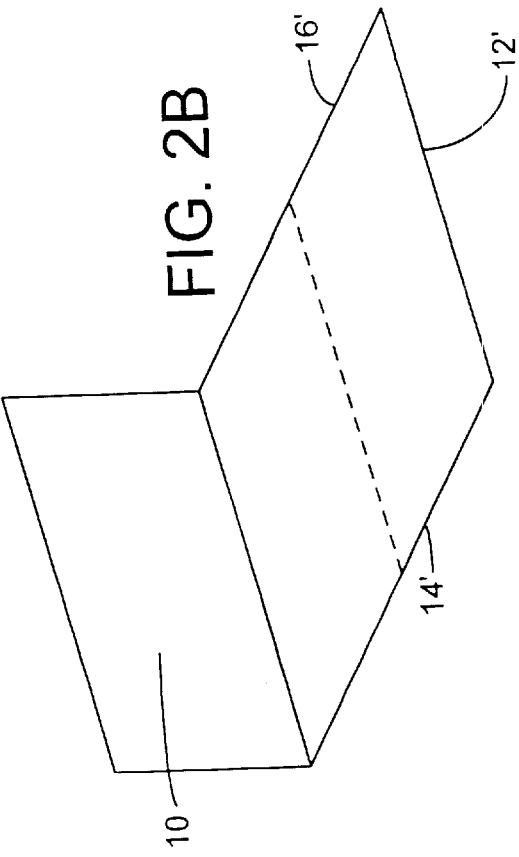
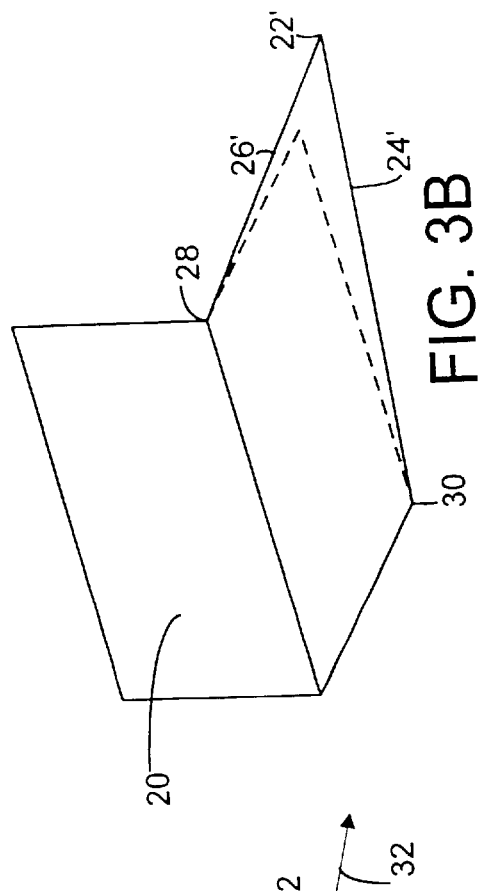
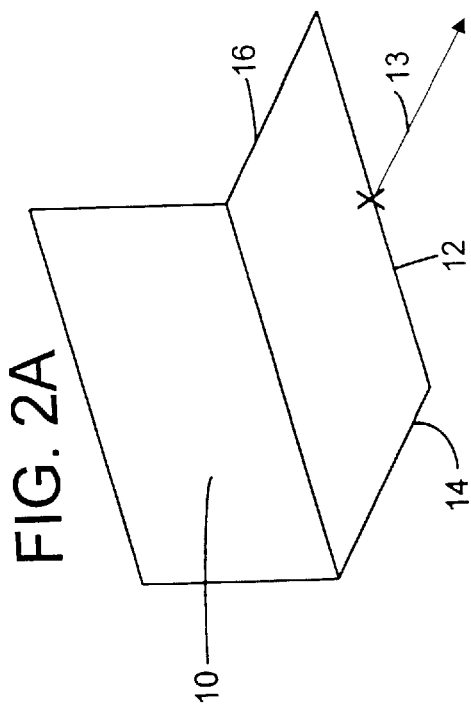
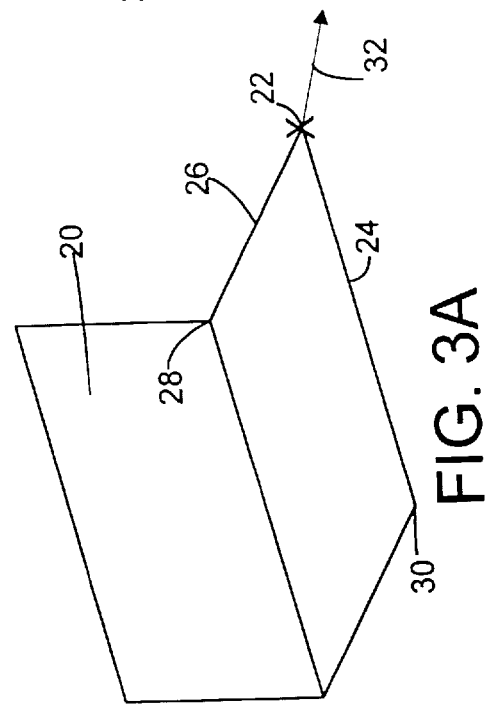

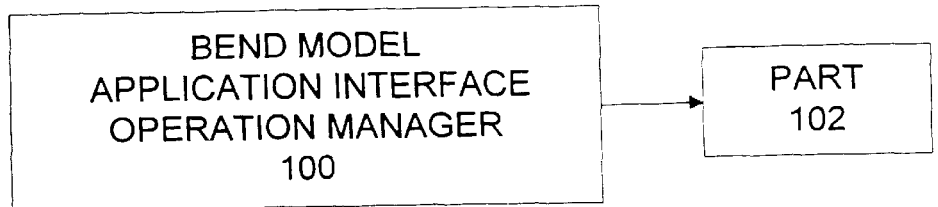
FIG 18
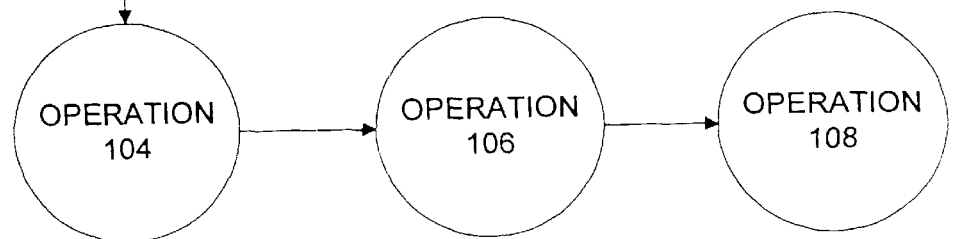
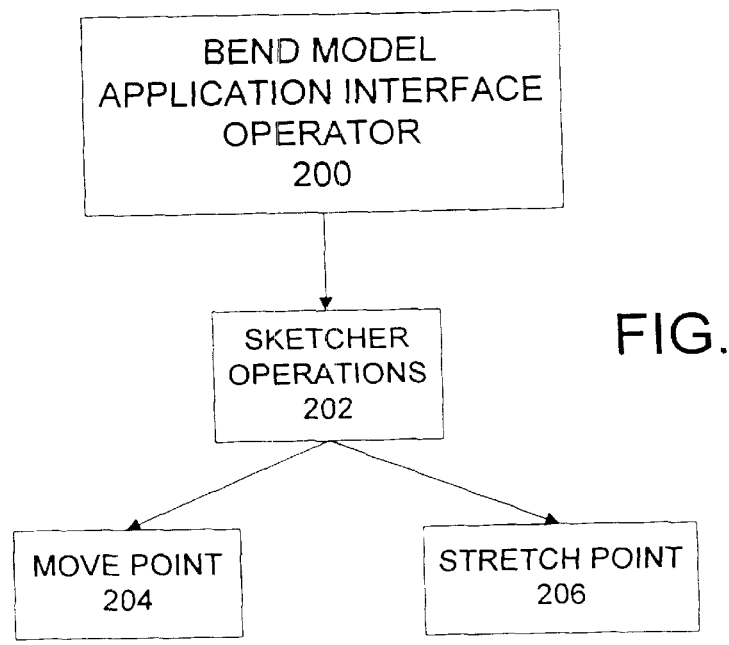
FIG. 19

SKETCHER

BACKGROUND OF THE INVENTION

1. Field of the Invention

The present invention relates to the field of computer-aided design. More particularly, the present invention relates to editing computer generated sheetmetal part models and providing the ability to undo and/or redo all previously executed editing operations.

2. Description of the Related Art

Traditionally, editing of sheetmetal part models is performed in two dimensions using orthographic views of the part by drawing lines one by one to create or modify a model. For example, with reference to FIG. 1 eight steps (a–h) required to add a flange to a face of a part model are shown. The editing is performed by drawing one line at a time and ensuring the connectivity of the lines at each step.

In some cases, it is possible to view the editing of entities (e.g., lines, end points, and arcs) in three dimensions (3D). Most existing 3D editing methods, however, are non-intuitive. For example, SPI of Ahrensburg, Germany, has developed sheetmetal packages that can be added on to standard computer-aided design (CAD) systems such as AutoCAD from Autodesk of San Rafael, Calif. and Solid-Works99 from SolidWorks of Concord Mass. These add-on systems transform standard CAD drawings into sheetmetal drawings and enable a user to parametrically edit the sheetmetal part models. Such a system, however, suffers from the drawback that the user cannot see the modifications as they are occurring. Furthermore, such a system is non-intuitive. Thus, a need exists for a system that allows editing of two dimensional and three dimensional sheetmetal part models while allowing the user to view the modifications in real time.

SUMMARY OF THE INVENTION

According to the present invention, a method is provided for graphically editing a computer generated sheet metal part model. The method includes displaying the sheet metal part model on a computer display screen, selecting an entity of the sheet metal part model to edit, and selecting an editing operation to be performed on the selected entity. The method also includes performing the selected editing operation on the selected entity, modifying the sheet metal part model in accordance with the performed editing operation, and displaying the modified sheet metal part model on the computer display screen. Consequently, a user views modifications of the sheet metal part model in real time.

According to a preferred embodiment, performing the selected editing operation is accomplsihed by moving a cursor shown on the computer display screen. In addition, a snapping feature is provided to snap an entity to a selected snap point by either angle or length.

In one embodiment, the sheet metal part model is displayed three dimensionally. Alternativley, the sheet metal part model is displayed two dimensionally.

Preferable editing operations are changing existing geometry and creating new geometry. Changing existing geometry can include either breaking the selected entity, moving the selected entity, or stretching the selected entity. Creating new geometry can include either creating a new entity or creating a new corner.

According to a preferred embodiment, an operation manager object is provided for each sheet metal part model. The operation manager object includes a list of every editing operation performed on the part and points to the most recently performed editing operation. Further, each newly created and executed editing operation has an ID that is added to the list after successful execution of the editing operation.

An undo feature may be provided to undo previous editing operations. The undo feature replaces a new entity of a sheet metal part model, which is assigned a unique ID number when the new entity is created by the previous editing operation, with an old entity. Subsequently, the undo feature deletes the new entity from the sheet metal part model.

According to another aspect of the present invention, a computer program embodied in a computer readable medium is provided. The computer program enables graphical editing of a computer generated sheet metal part model. The computer program includes several systems such as a system that displays the sheet metal part model on a computer display screen, and a system for facilitating selecting an entity of the sheet metal part model to edit. Other systems of the computer program are a system for facilitating selecting an editing operation to be performed on the selected entity and a system that performs the selected editing operation on the selected entity. Additional systems include a system that modifies the sheet metal part model in accordance with the performed editing operation and a system that displays the modified sheet metal part model on the computer display screen. The computer programs allows a user to views modifications of the sheet metal part model in real time.

According to a preferred embodiment, the system performing the selected editing operation includes a system that moves a cursor shown on the computer display screen. Alternatively, the system performing the selected editing operation selects a dimension of the sheet metal part model and modifies that dimension.

In one embodiment, the sheet metal part model is displayed three dimensionally. Alternativley, the sheet metal part model is displayed two dimensionally.

Preferable editing operations are changing existing geometry and creating new geometry. Changing existing geometry can include either breaking the selected entity, moving the selected entity, or stretching the selected entity. Creating new geometry can include either creating a new entity or creating a new corner.

According to a preferred embodiment, an operation manager object for each sheet metal part model is included in the computer program. The operation manager object includes a list of every editing operation performed on the part and points to the most recently performed editing operation. Further, each newly created and executed editing operation has an ID that is added to the list after successful execution of the editing operation.

An undo feature may be provided to undo previous editing operations. The undo feature replaces a new entity of a sheet metal part model, which is assigned a unique ID number when the new entity is created by the previous editing operation, with an old entity. Subsequently, the undo feature deletes the new entity from the sheet metal part model.

According to another aspect of the present invention, a system is provided for graphically editing a computer generated sheet metal part model. The system includes a system that displays the sheet metal part model on a computer display screen; a system that selects an entity of the sheet metal part model to edit; and a system that selects an editing operation to be performed on the selected entity the editing system also includes a system that performs the selected editing operation on the selected entity; a system that modifies the sheet metal part model in accordance with the performed editing operation; and a system that displays the modified sheet metal part model on the computer display screen. Thus, a user views modification of the sheet metal part model in real time.

BRIEF DESCRIPTION OF THE DRAWINGS

The present invention is further described in the detailed description which follows, by reference to the noted drawings by way of non-limiting examples of preferred embodiments of the present invention, in which like reference numerals represent similar parts throughout the several views of the drawing, and wherein:

FIGS. 2A and 2B illustrate an exemplary move operation executed on a line of a sheet metal part model, in accordance with an aspect of the present invention;

FIGS. 3A and 3B illustrate an exemplary move operation executed on a corner of a sheet metal part model, in accordance with an aspect of the present invention;

FIG. 18 illustrates an exemplary class diagram of a sheet metal part model editing system, in accordance with an aspect the present invention; and FIG. 19 illustrates an exemplary operator class diagram for a sheet metal part model editing system, in accordance with an aspect the present invention.

DETAILED DESCRIPTION OF THE PREFERRED EMBODIMENTS

Figure 1:
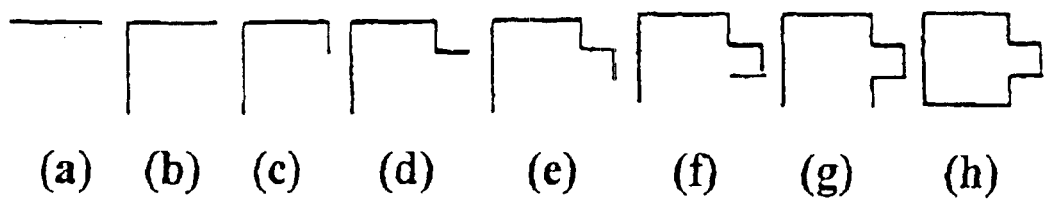
FIG. 1 illustrates a conventional editing operation.

The present invention relates to a system and a method for editing sheetmetal part models in 3D and 2D while enabling a user to see the results of the editing directly on the model when performing the editing operations. Preferably, the editing operations are performed with an input device, such as a mouse. In such a case, mouse dragging operations (i.e., depressing a mouse button and moving the mouse before releasing the button) enable direct editing. The present invention also enables more accurate editing by parametrically modifying the dimensions of the part. One advantage of the present invention is that association between the dimensions and the part is preserved when the editing operations are executed. Thus, the dimensions are saved and can be visualized during various configurations of the part, such as 2D flat, 3D folded or during an intermediate bending step.

Basic entities of a part that a user may manipulate are lines, end points, and arcs. According to the present invention, the user selects an entity, selects an operation to be performed on the entity and executes the editing operation by dragging the mouse. For example, a face can be stretched or shrunk by selecting a corner of the face and dragging the mouse. Notches or grooves can be added by simply selecting a line to break and dragging the broken line. One feature of the present invention is that the geometry of the part is consistent during every intermediate editing stage so that after editing is performed, every face has a single outside loop, which is non-self intersecting, and may have additional inside loops that are neither self-intersecting nor intersecting with the outside loop.

The present invention enables two basic editing operations: modifying existing geometry, and creating new geometry. Modifying existing geometry will be discussed first. Two basic modifications to existing geometry are available to a user. The user may break an entity, or reposition an entity.

Two modes of repositioning are available, stretch and move. In move mode, only adjacency constraints are observed and change to the face is restricted to the absolutely required minimum necessary to maintain the adjacency. In the stretch mode, angles between adjacent edges are also preserved, thus changes are restricted to the minimum required in order to maintain adjacency and the angles.

With reference to FIGS. 2A and 2B, moving a line is illustrated and will now be discussed. For the case of line movement, an editing operation is identical for both move and stretch modes. A sheetmetal part model 10 has three edges 12, 14, 16, one of which a user would like to move. Initially, the user selects a line by positioning a cursor on a line and depressing a mouse button. In this example, the user selected edge 12. Then the user drags the mouse to create a move vector 13 by which line 12 is to be moved. The geometry resulting from the editing operation is computed as follows. Repositioned line 12' is drawn parallel to line 12, and extends between both end points of line 12 moved by the movement vector 13. Lines 14' and 16' are the extensions of lines 14 and 16 intersecting with line 12' as seen in FIG. 2B. In each of FIGS. 2B, 3B, 4B, and 5B, the dashed line indicates the positions of the repositioned entities before the editing operation occured, i.e., the positions shown in FIGS. 2A, 3A, 4A, and 5A, respectively. When the edges 14 and 16 converge towards each other, it must be ensured that the line being moved is not repositioned beyond the intersection of the extending lines. According to a preferred embodiment, move mode is selected from a pop-up menu triggered by a right button click. Subsequently, the mouse cursor is moved to highlight the entity to be selected and the entity is dragged to its new location.

Move mode for an end point is now described with reference to FIGS. 3A and 3B (in this case, moving is different than stretching). In move mode, repositioning a selected end point 22 of part model 20 by vector 32 requires modifying two edges 24 and 26. The resulting face is obtained by changing the coordinates of point 22, i.e., the end points of lines 24 and 26, such that the two other end points 28 and 30 remain unchanged. That is, new end point 22' is the original end point 22 plus the vector 32. New lines 24' and 26' are the line connecting new end point 22' with old end point 30 and the line connecting new end point 22' with old end point 28, respectively. Move mode does not maintain the angle between the two edges intersecting at the selected point. Thus, a different shape face results, as seen in FIG. 3B.

Figure 4B:
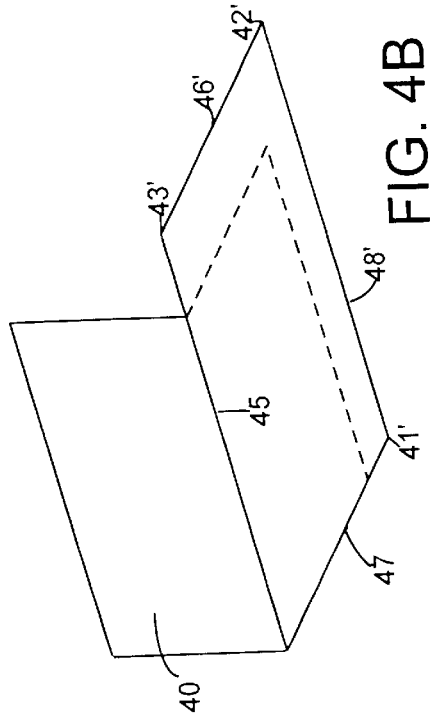
FIGS. 4A and 4B illustrate an exemplary stretch operation executed on a corner of a sheet metal part model, in accordance with an aspect of the present invention.
Figure 4A:
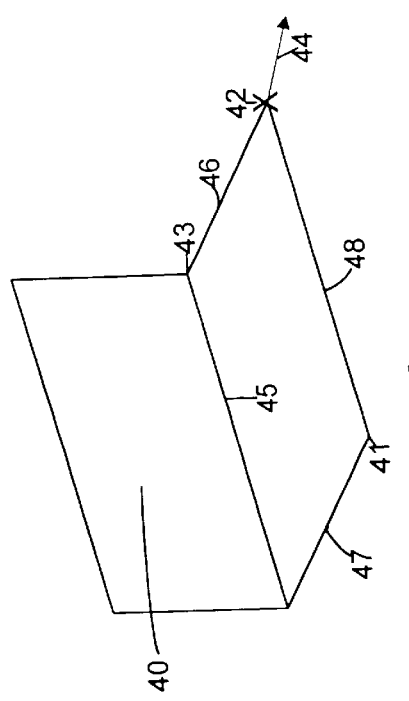

With reference to FIGS. 4A and 4B, stretch mode is illustrated and will now be discussed. In stretch mode, repositioning an end point requires modifying a selected end point 42 and four edges 45, 46, 47, 48 because the angle between the edges is preserved. Thus, when point 42 of part 40 is selected and moved by a vector 44, the resulting geometry is shown in FIG. 4B. That is, new point 42' equals original point 42 plus the repositioning vector 44. New lines 46' and 48' are the lines which pass through new point 42' and are parallel to original lines 46 and 48. Corners 41 and 43 are also repositioned. That is, new points 41' and 43' are the intersection of extended line 47 and new line 48', and extended line 45 and new line 46', respectively. The operation is performed by selecting stretch from a pop-up menu, according to a preferred embodiment obtained with a right button click, moving the mouse cursor to highlight the end point 42 to be moved, and dragging the selected end point to its new location.

Figure 5B:
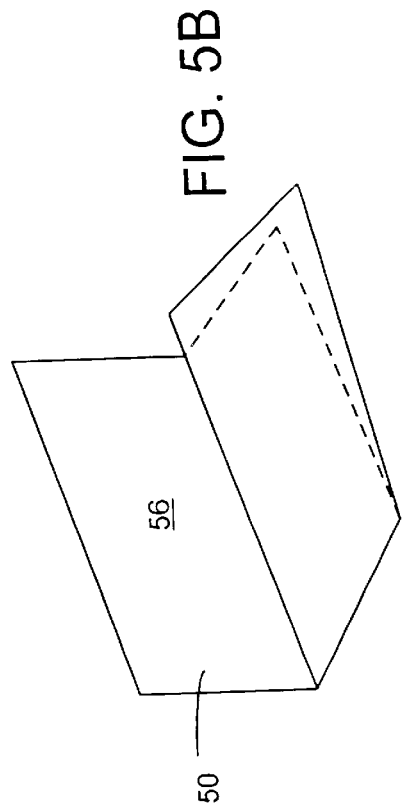
FIGS. 5A and 5B illustrate an exemplary stretch operation executed on a corner, which includes a bendline, of a sheet metal part model, in accordance with an aspect of the present invention.
Figure 5A:
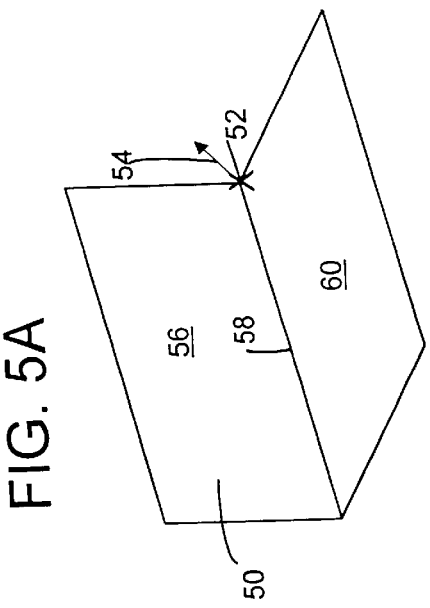

As seen in FIGS. 5A and 5B, when the selected point 54 of model 50 is an end point of a bendline 58, an additional face 56 also moves. However, a bendline or its end point on a 3D folded part first requires defining the moving/editing plane. There are two possible options for choosing the moving/editing plane: the plane of the face 56 or the plane of the face 60. As seen in FIG. 5A, in case the face 56 is chosen as the editing plane, then face 56 is moved. The user selects the editing plane by selecting a face prior to moving the bend point or bendline. FIG. 5B shows the part after movement. Note that face 56 has moved in this example, due to the modification of the bendline 58.

Figure 6:
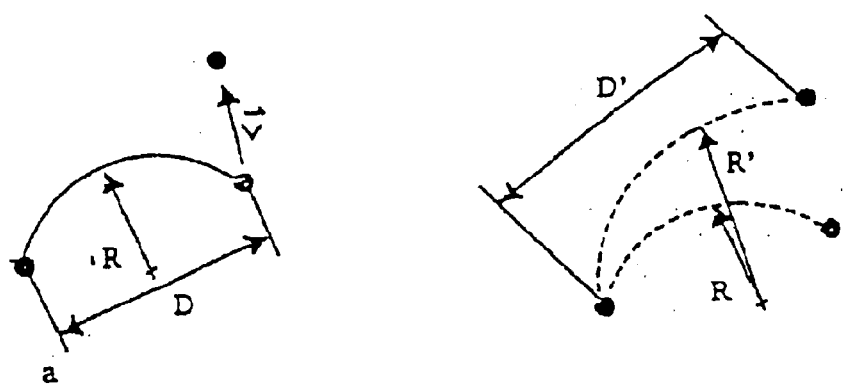
FIG. 6 illustrates the general principle involved in repositioning an arc, in accordance with an aspect of the present invention.

When an end point being repositioned is between an arc and a line, or an arc and another arc, a more complicated situation arises. The principle employed when modifying the end point of an arc is that arc modification is limited to scaling and moving the arc as a whole. The formal condition is:

$$R' = R \times D'/D. \quad (1)$$

Where R is the radius of the arc before its end point was modified, D is the distance between the end points before the arc is modified, R' is the resulting radius and D' is the distance between the end points of the modified arc. V is the vector corresponding to the distance a selected point is moved, as illustrated in FIG. 6.

Figure 7:
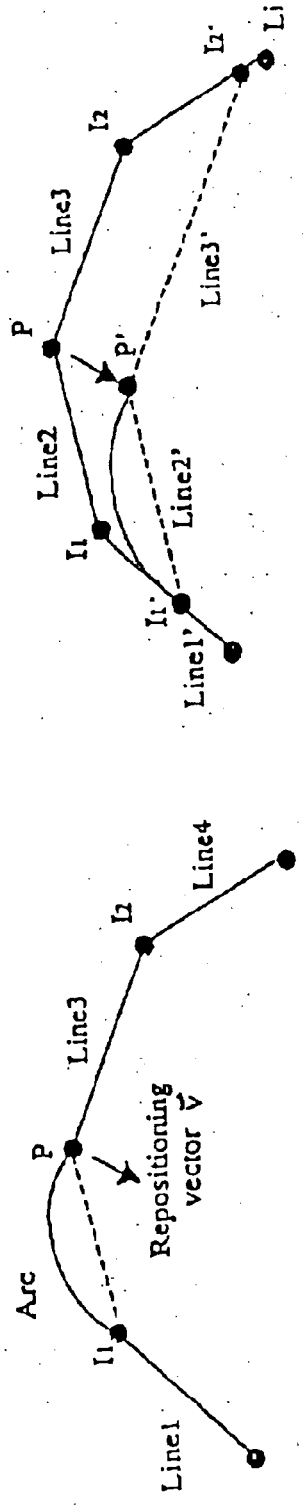
FIG. 7 illustrates an exemplary editing operation in which an end point of an arc is repositioned, according to an aspect of the present invention.
Figure 8:
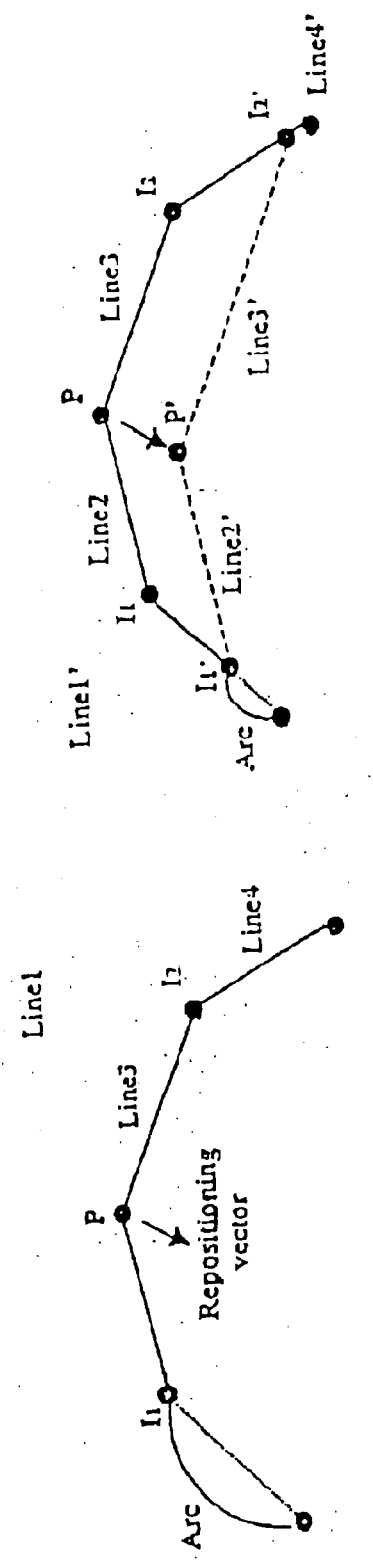
FIG. 8 illustrates an exemplary editing operation in which an arc flanks one of the lines connected to the selected point being repositioned, according to an aspect of the present invention.
Figure 9:
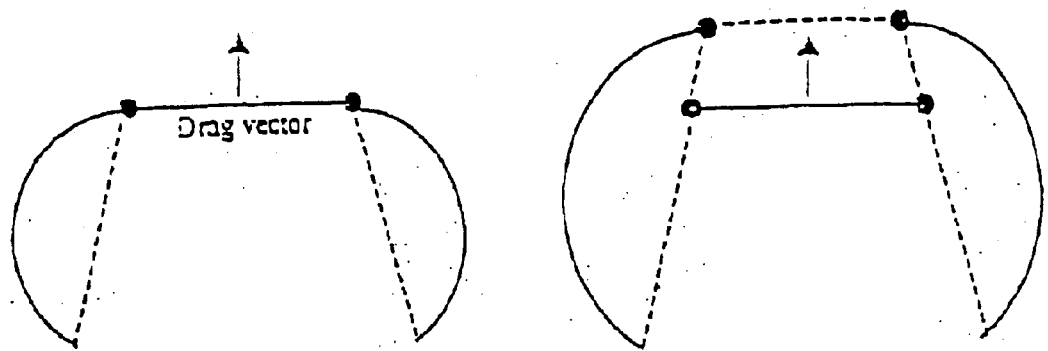
FIG. 9 illustrates an exemplary editing operation in which an arc flanks each side of a line being repositioned, according to an aspect of the present invention.
Figure 10:
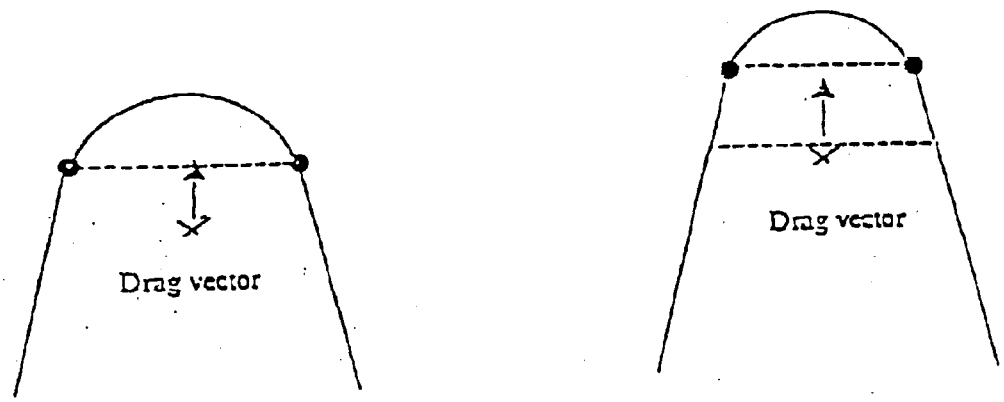
FIG. 10 illustrates an exemplary editing operation in which a line flanks each side of an arc being repositioned, according to an aspect of the present invention.
Figure 11:
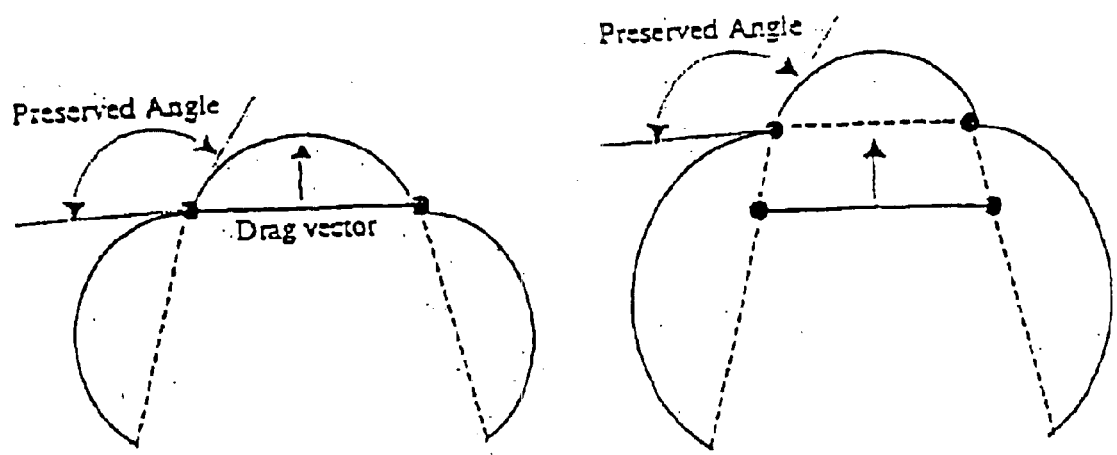
FIG. 11 illustrates an exemplary editing operation in which an arc flanks each side of an arc being repositioned, according to an aspect of the present invention.

During stretch mode, the end points of the arc are modified as if the arc is aligned as illustrated in FIG. 7. In case an arc flanks one of the lines or arcs connected to the selected point, the arc is modified according to equation (1), as seen in FIG. 8. If a line is moved and the line is flanked by arcs, the arcs are modified according to equation (1), as seen in FIG. 9. FIG. 10 shows the case of an arc being moved when the arc is flanked by lines. In this case, the arc is again modified according to equation (1) and the angle is preserved. As seen in FIG. 11, moving an arc flanked by arcs, the preserved angle is shown and the modification as described above is used.

Figure 12:
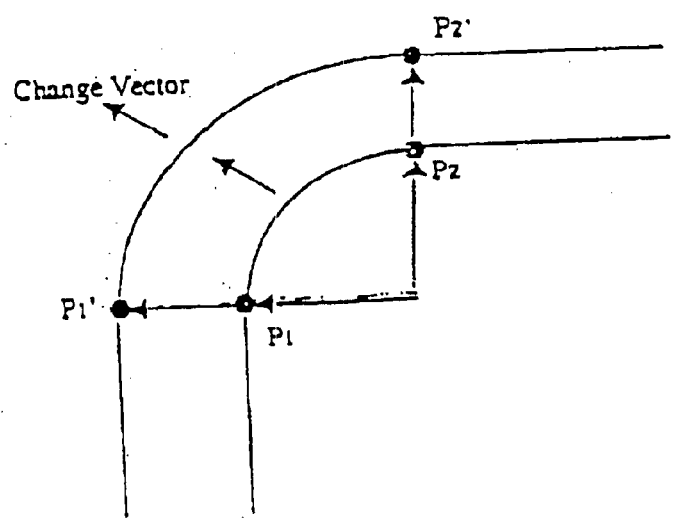
FIG. 12 illustrates an exemplary editing operation in which a radius of an arc is repositioned, according to an aspect of the present invention.

Modifying the radius of an arc flanked with lines is now described with reference to FIG. 12. The operation of modifying the radius of an arc is equivalent to moving or stretching the end points of the arc along the radius, as illustrated in FIG. 12. The end points P1, P2 are moved to become P1', P2', respectively. This requires promulgating the modification according to the line arc meeting point modification rule described above. The new radius equals the old radius plus the change vector. The intersection between extended lines and the arc is calculated with the new radius.

Figure 13:
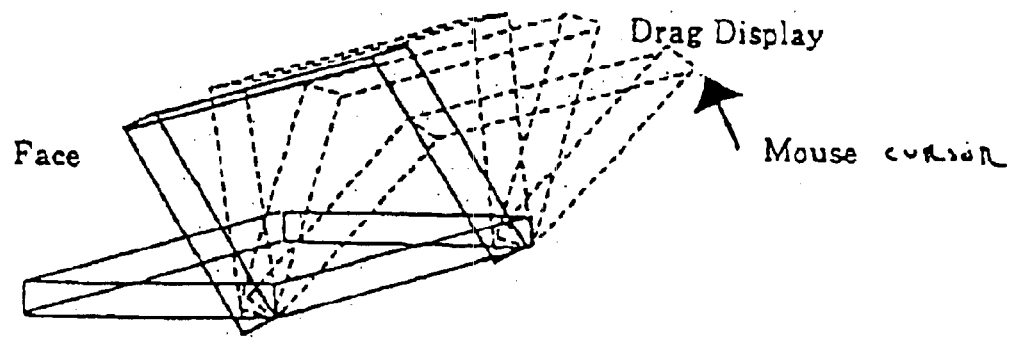
FIG. 13 illustrates an exemplary editing operation in which a bend angle is repositioned, according to an aspect of the present invention.

Repositioning bend angles is another feature of the present invention. FIG. 13 shows modification of a bend angle between faces. The user simply indicates that the bend angle is going to be modified and then selects one of the faces and drags it to a desired position. The user may also edit the bendline. For example, the user may modify the bend deduction, the inside radius, the V-width, the bend type and the bend manufacturer type. In a preferred embodiment, a dialog box is provided that allows the user to specify these parameters.

Figure 14:
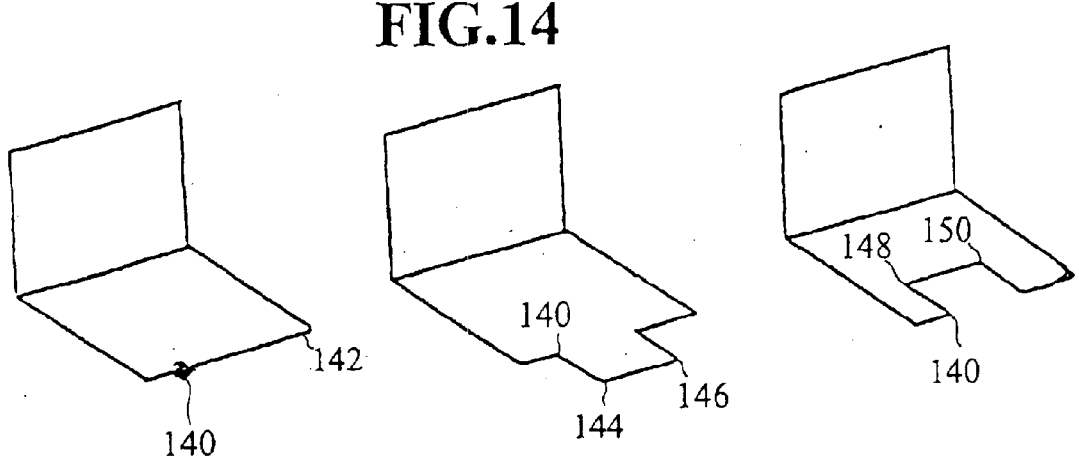
FIG. 14 illustrates exemplary breaking operations executed on a line of a sheet metal part model, in accordance with an aspect of the present invention.

Breaking entities is now described. An edge may be broken, as seen in FIG. 14. In this case, the user selects a point 140 on an edge or a bendline 142 and instructs the system to break the edge 142 at the selected point 140. In a preferred embodiment, a dialog box appears asking into how many pieces to break the edge 142. Preferably, all the pieces are of the same length. Alternatively, the user selects the size of the pieces, for example, with the mouse.

Once a break is selected, two extra pieces are created to facilitate adding or deleting a rectangle from a face. The two additional pieces are undetectable to the eye. Thus, when a single point is selected with the mouse, two extra minuscule pieces are added perpendicular to the selected edge 142 so that once the line is moved, the edges connecting the moved line with the original edges already exist.

To add a rectangular section, the break operation is performed by clicking on the edge 142 to be cut, moving the mouse to a point 144 outside the face, and dragging the mouse cursor to a point 146 on the other end of the rectangular section being created. To subtract a rectangular section, the user selects the edge 142 to be cut, moves the cursor to a point 148 inside the face, and drags the mouse cursor to indicate the other end point 150 of the rectangular section being subtracted.

Figure 15:
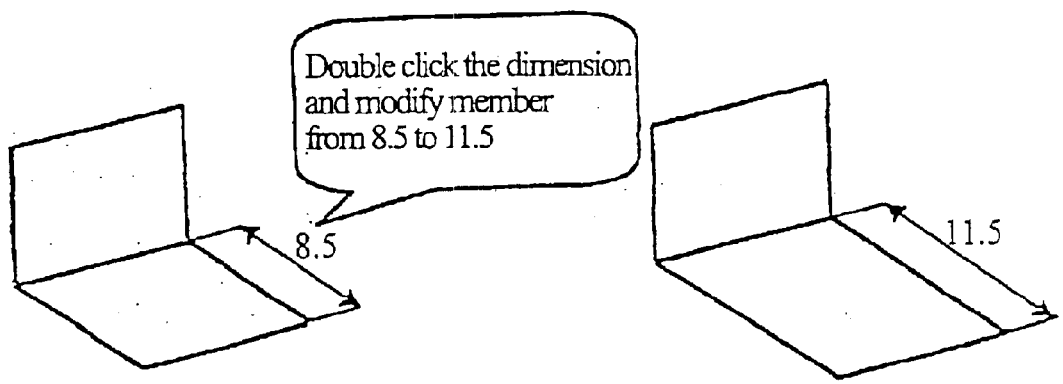
FIG. 15 illustrates an exemplary parametric editing operation executed on a line of a sheet metal part model, in accordance with an aspect of the present invention.
Figure 16:
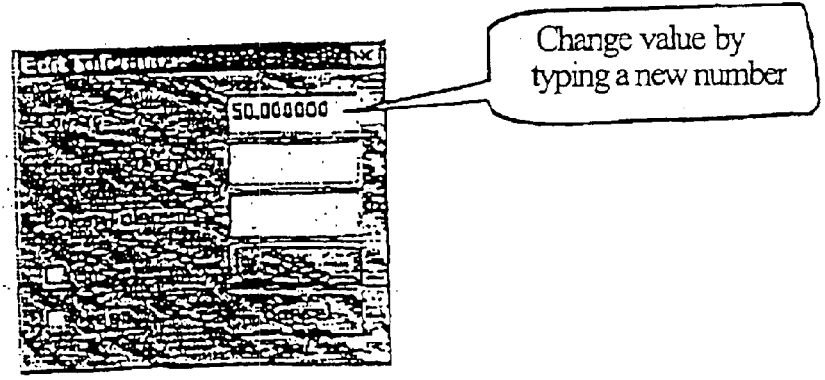
FIG. 16 illustrates an exemplary dialog box associated with the parametric editing operation shown in FIG. 15, in accordance with an aspect of the present invention.

A dimension may also be changed parametrically. According to this aspect, the user selects the end point or edge to be moved, double clicks on the dimension to be modified and types the new dimension value in a dimension dialog box, as shown in FIGS. 15 and 16. In the case of a two face dimension, i.e., a dimension extendible in two dimensions, the user selects the face to be modified, double clicks on the dimension to be modified, and types the new dimension value in the dimension dialog box. However, in this case, there are two ways to modify each dimension and therefore the user must also select which side of the dimension will be modified. The options are distinguished by selecting the face to be modified. If no face is selected, the decision is made for the operator.

According to another aspect of the present invention, a user can place a dimension between any two arbitrary entities on the part and modify the dimension. This allows a user to align holes on different faces by specifying that the dimension between the center of holes equals zero.

Figure 17A:
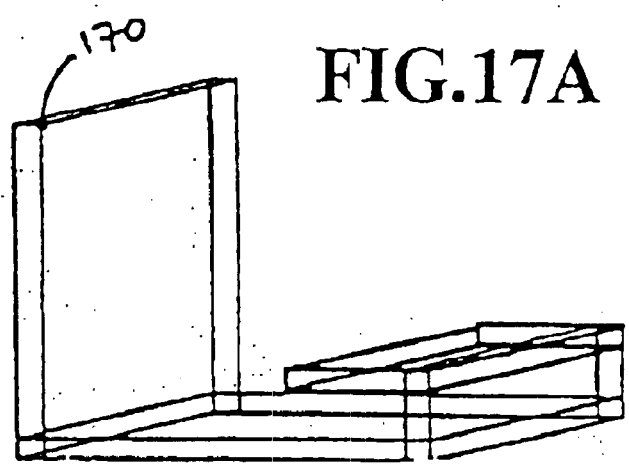
FIGS. 17A, 17B, and 17C illustrate an exemplary snapping feature, in accordance with an aspect of the present invention.

According to another aspect of the invention, a snapping feature is provided. For example, as seen in FIG. 17A, a user may select a point 170 to which a face should be snapped to. The system may then snap to that point by length, angle or both. The system thus calculates the appropriate angle and/or length by passing a line coplanar with the face to the snap point 170. In another case, when a first face is stretched near to another face, the first face connects to the other face. Similarly, any edge can be snapped to. According to another aspect, when a 2D object is displayed, a grid is superimposed in the plane of the 2D object. Thus, when the face is stretched, it will snap to the grid to enable more precise editing. According to a preferred embodiment, snapping only occurs when the face being repositioned contains a single bendline. Further, the angle and the length can be changed parametrically in a dialog box any time before or after the snapping occurs.

Figure 17B:
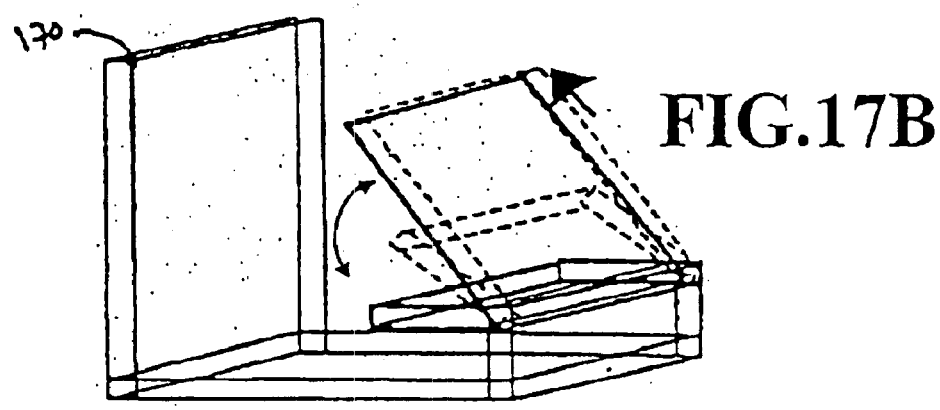
Figure 17C:
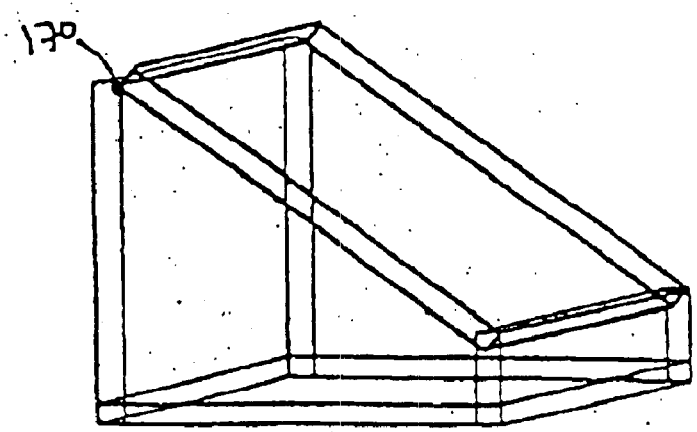

When snapping by angle and length, first the change angle is determined by calculating the necessary angle. In a preferred embodiment, calculation considers whether the inside or outside (i.e., top or bottom) of the face has been selected. Then the change angle is executed, as shown in FIG. 17B. Finally, the length is changed, i.e., the face is extended until it contacts the snap to point, as shown in FIG. 17C. Whenever changing an angle, the bend deduction is recalculated as is the inside radius. In an alternate embodiment, if the new angle is less than 30°, then it is set to 0°. Similarly, whenever the inside radius, manufacturers bend type or selection between a front bend (<180°) or back bend (>180°) is changed, a new bend deduction and inside radius are calculated. In the alternative, rather than calculating the new values, they may be looked up in an appropriate database. Note, however, the bend deduction only affects the flat dimension, not the snap dimension.

After any editing operations occurs, the part must be validated. That is, the loop circumscribing the part model is checked to make sure it is not a self-intersecting loop. Further, it is confirmed that there is no intersection with an outside loop. If the validation is successful, the display can be modified. Otherwise, the operation is canceled and no changes occur on the display.

According to a preferred embodiment, a group function is provided. With the group function, the user can select multiple entities, preferably of a similar type. The selected entities are then added to a group. Consequently, any operation performed on one entity is performed on each entity in the group. In an alternate embodiment, an entity can be in multiple groups, in which case the user can hit a key to switch between different groups. In a preferred software embodiment, a group manager class tracks the entities within a group. The group manager determines which group an entity belongs to by analyzing a unique ID of the entity.

Referring to FIG. 18, a diagram showing a bend model application interface operation manager class 100 is now described. The bend model application interface (BMAI) operation manager 100 implements an undo/redo mechanism for use with the previously described editing operations. The BMAI operation manager class 100 also provides an interface for accessing bend model data, which hides many of the routine information details and technicalities from the application programmer. The BMAI operation manager class 100 contains a list of BMAI operations that have been performed on the part and is associated with a specific part, preferably by having a pointer to a part class 102. When several parts are currently active in an application, a BMAI operation manager object 100 exists for each part.

The operations in the BMAI operation manager list do not necessarily relate to modifying the part. For example, operations modifying tooling associated with the part are also included; however, all operations are related to the part. That is, the operations 104, 106, 108 modify part data structures or data structures associated with the part. Creating BMAI operation manager operations for actions that query information on the part is unnecessary because these actions do not require undo/redo functionality. At each point in time, the BMAI operation manager object 100 points to the last executed BMAI operator. If a new BMAI operator is created and executed, then it is added to the BMAI operation manager after the current operation. Thus, if there were operations in the list following the current operation prior to the execution of a newly added operation, all the operations following the current operation are deleted before the new operation is added after the current operation. The BMAI operation manager class 100 may also include a flag indicating whether the undo/redo mechanism should be disabled, for users who prefer maximum performance.

Exemplary functions within the BMAI operation manager class 100 are now explained. An ADD OPERATOR function adds a new operator to the BMAI operation manager at the end of the current transaction (group of operators). The function fails if there are no current transactions in which case a new transaction is created by invoking a BEGIN TRANSACTION function. The ADD OPERATOR function adds a new operator after the last operator in the current transaction. Thus, operators cannot be added in the middle of a transaction. If the current transaction contains no operators, the new operator will be added after the transaction of the current operator.

When invoking ADD OPERATOR, the current operator does not necessarily belong to the current transaction. That is, when the current transaction is empty, the current operator pointer can point to any operator. On the other hand, when the current transaction is not empty, then either the current operator belongs to the current transaction, or the current operator is the last operator in the previous transaction.

If any operators follow the current operator, then they are first deleted. The new operator is then assigned the ID of the current transaction. This function does not move the current operator because the current operator is moved only by executing UNDO OPERATOR and REDO OPERATOR functions described next.

The REDO OPERATOR function redoes the next operator following the current operator by calling the REDO OPERATOR member function of the operator following the current operator. Once the next operator has been executed, it becomes the new current operator and its transaction will become the new current transaction.

The UNDO OPERATOR function undoes the current operator. As a result, the current operator pointer moves forward by one operator. The new current operator's transaction becomes the current transaction.

A REDO TRANSACTION function redoes the entire current transaction from the current operator until the end of the transaction. If the current operator is the last operator in the transaction, the transaction of the next operator becomes the current transaction. Otherwise, the current transaction remains unchanged.

An UNDO TRANSACTION function undoes the entire current transaction from the current operator until the beginning of the transaction. If no transactions are currently open, then the transaction of the current operator becomes the current transaction. UNDO TRANSACTION calls the UNDO OPERATOR function for every operator in the transaction of the current operator, beginning with the current operator and going backwards towards the beginning of the list of operators until the current transaction becomes different from this transaction, i.e., until the first operator in this transaction is undone.

An OPEN TRANSACTION ID function may be provided to obtain the ID of the open transaction. An IS OPERATOR LAST IN TRANSACTION function may be provided to check if a given operator is the last operator in its transaction. A similar function is provided to check whether a given operator is the first operator in its transaction. Finally, functions may be provided to disable and enable the undo/redo capability.

As shown in FIG. 19, a bend model application interface operator 200 may be provided. The bend model application interface (BMAI) operator is a base class for all BMAI operations that modify the part. It enables a list of operations to be performed in a BMAI operation manager 100 and is created for the purpose of specifying a common functional interface of BMAI operators that facilitate undo/redo functionality. Specific BMAI operation classes are derived from the BMAI operator 200 to implement the operations. Exemplary operations are move point 204 and stretch point 206. It is noted that a sketcher operation class 202 may be an intermediate class between the BMAI operator and the actual operator classes implementing the operation.

If the operator creates any persistent objects, i.e., objects that have an identity and that might get referred to later, the operator should ensure that every time a REDO function is executed on the operator, every persistent object is assigned the same ID. For example, an operator that creates a setback, creates two persistent objects. One is a setback object itself, the other is a setback edge (i.e., a line) created when setback is applied. When a REDO function of the setback operator is called, the operator should first check whether unique IDs have been previously created for the setback object and the setback edge. If not, the operator generates unique IDs for both new objects and then creates a setback object and set its ID equal to the generated ID. It also stores the unique ID of the setback edge in the setback object so that when the setback is applied, this ID will be used for the setback edge. It also stores these IDs within the setback operator for future use. This is necessary because when the setback operator is undone, and then redone, the same IDs as the ID used the first time need to be used (for the setback object and setback edge). To guarantee uniqueness, when the unique IDs are generated for the setback object and setback edge, the IDs will never be generated again and thus will always stay unique.

The BMAI operator class 200 preferably includes an ID of the transaction to which the operation belongs. The ID is assigned by the BMAI operation manager 100. The BMAI operator 200 typically also includes a pointer to the BMAI operation manager 100 to which this operator belongs. The operator is added to a specified BMAI operation manager 100 after it is created by calling the ADD OPERATOR function of the BMAI operation manager 100. Note that this operator is not executed until the REDO OPERATOR function is called on this operator. Further, note that this function does not move the current operator pointer (part of a constructor) of the BMAI operation manager. A function should be provided to get the transaction ID of the operator. Finally, a REDO function should be provided to execute the operator, as well as an UNDO function that undoes the operation.

A unique ID is stored in the BMAI operation manager. The operator stores a transaction ID number. Before any operation is executed, the manager is queried to determine the current ID. According to a preferred embodiment, all operations that have been executed are displayed on the screen allowing a user to redo/undo a selected operation and view an undo/redo tree.

According to a preferred embodiment, the sketching system of the present invention modifies only original versions. That is, neither 3D versions nor flat versions having features, such as setback applied are modified. Although the preferred embodiment only operates on the original version, it is within the scope of the present invention for sketcher operations to be stored in a list so that operations can be performed on the flat or 3D version. Old information is stored so that undo is possible with each operator class. Further, it is necessary to know the input version so that the appropriate calculations are made.

Every entity on the part has a unique ID to support undo/redo. For example, when adding a new face and then deleting it, the common edge with the new face is restored by finding its ID and redrawing it. With redo, the recreation has to be with the exact same ID in the exact same orientation. When adding a new face, the common edge becomes a bendline with a new ID. When deleting, it becomes an edge again with the old edge ID.

For all mouse move operations, the previous transaction is undone before the next transaction occurs, for example, when stretching occurs. The mouse moves to create a larger face, the smaller stretched face is undone, and a new vector is calculated from the original face, in contrast, to calculating a vector from the smaller face. Further, when moving an entity, the move vector, not the new location coordinates is stored. Thus, when the undo function is implemented, the reverse vector is calculated.

According to a preferred embodiment, a pattern feature may be provided. That is, the user can select a predetermined pattern to appear on the sheetmetal part model. For example, the user may select a certain hole configuration pattern and designate the radius of the holes and the center of the pattern. Subsequently, the pattern will be applied to the sheetmetal part. Alternatively, a user could select a reference point as a first hole and other holes of the pattern will be applied relative to the first selected hole.

Another feature of the present invention is 3D editing, which modifies faces and bend angles. In the context of 3D editing, 3d stretching of lines is discussed. Initially, it is determined whether the flat or 3D version of the part is being modified. Next, the move vector is obtained from the user interface and two points (one on the line and the other where the mouse is) are obtained. The 2D points corresponding to the display screen are converted to 3D points by mapping into the face's plane. In order to determine which face is being worked with a viewer class is queried to traverse a list of faces. For example, if the point is located within a hole, there is no plane. Furthermore, the system must consider whether a front face or back face is being operated on when two faces are parallel to each other. Next, a vector with two 3D points is created and passed to the operator along with the line being stretched. The operator executes by first finding the corresponding line in the output version and mapping the vector into the output version (i.e., for a flat view, the vector will be different than for a 3D view). The operator then creates a line parallel to the selected edge and extends the lines adjacent to the selected edge by the vector. If a cut operation was selected, the minuscule lines perpendicular to the cut points are extended instead of the adjacent edges. Then the intersection between the parallel line and the extended edges are found. Subsequently, four points are modified: the point on each extended edge and the two points on the edge being moved. After modification, the new points are validated by determining whether the loop is non-self intersecting and whether the new loop intersects the outside loop or any other loop. If the loop is validated, the viewer is updated.

Execution of an exemplary operation is now described. Upon detecting a mouse drag, the system first checks whether snapping is possible. If snapping is enabled and a snap point is highlighted, then the point is snapped to. Second, it is determined whether a line is highlighted. Third, the system calculates where a face moves to by creating a plane perpendicular to the bendline through the point on the edge where the mouse is. Then, wherever the mouse moves to is projected into that plane to give a third point and thus the angle. Finally, an operator is created and added to the operator list and then the transaction is executed. Note, when dragging, undo and redo are continuously occurring. A view of the display is updated whenever the redo occurs, but not when the undo occurs. According to a preferred embodiment, when a mouse move occurs and an entity is being modified, the dimensions modify simultaneously on the screen in real time.

While the invention has been described with reference to several exemplary embodiments, it is understood that the words that have been used are words of description and illustration, rather than words of limitation. Changes may be made within the purview of the disclosure as presently stated and as amended, without departing from the scope and spirit of the invention in its aspects. For example, although the description has been in terms of using a mouse as an input device, other input devices such as a keyboard, a joystick or a touch screen may be used instead. Further, although the invention has been described with reference to particular means, materials, and embodiments, the invention is not intended to be limited to the particulars disclosed herein. Rather, the invention extends to all functionally equivalent structures, methods and uses. Although the present invention has been described in considerable detail with reference to certain preferred embodiments, other embodiments are possible. Therefore, the scope and spirit of the appended claims should not be limited to the description of the preferred embodiments contained herein.

What is claimed:

1. A method for graphically editing a computer generated sheet metal part model, the method comprising:
    displaying the sheet metal part model on a computer display screen;
    selecting an entity of the sheet metal part model to edit;
    selecting an editing operation to be performed on the selected entity;
    performing the selected editing operation on the selected entity;
    modifying the sheet metal part model in accordance with the performed editing operation; and
    displaying the modified sheet metal part model on the computer display screen,
    wherein a user views the modification of the sheet metal part model in real time.

2. The method of claim 1, in which performing the selected editing operation further comprises moving a cursor shown on the computer display screen.

3. The method of claim 1, in which the sheet metal part model is displayed three dimensionally.

4. The method of claim 1, in which the sheet metal part model is displayed two dimensionally.

5. The method of claim 1, in which the editing operation comprises either changing existing geometry or creating new geometry.

6. The method of claim 5, in which changing existing geometry comprises either breaking the selected entity, moving the selected entity, or stretching the selected entity.

7. The method of claim 5, in which creating new geometry comprises either creating a new entity or creating a new corner.

8. The method of claim 1 further comprising an operation manager object assigned to each sheet metal part model, the operation manager object including a list of every editing operation performed on the sheet metal part model, the operation manager object pointing to the most recently performed editing operation, each newly created and executed editing operation having an ID that is added to the list after successful execution of the editing operation.

9. The method of claim 8, further comprising undoing a previous editing operation by replacing a new entity of a sheet metal part model, which is assigned a unique ID number when the new entity is created by the previous editing operation, with an old entity and deleting the new entity from the sheet metal part model.

10. The method of claim 1, further comprising snapping an entity to a selected snap point by either angle or length.

11. A computer program embodied in a computer readable medium, the computer program enabling graphical editing of a computer generated sheet metal part model, the computer program comprising:
    a system that displays the sheet metal part model on a computer display screen;
    a system for facilitating selecting an entity of the sheet metal part model to edit;
    a system for facilitating selecting an editing operation to be performed on the selected entity;
    a system that performs the selected editing operation on the selected entity;
    a system that modifies the sheet metal part model in accordance with the performed editing operation; and
    a system that displays the modified sheet metal part model on the computer display screen,
    wherein a user views the modification of the sheet metal part model in real time.

12. The computer program of claim 11, in which the system performing the selected editing operation further comprises a system that moves a cursor shown on the computer display screen.

13. The computer program of claim 11, in which the sheet metal part model is displayed three dimensionally.

14. The computer program of claim 11, in which the sheet metal part model is displayed two dimensionally.

15. The computer program of claim 11, in which the editing operation comprises either changing existing geometry or creating new geometry.

16. The computer program of claim 15, in which changing existing geometry comprises either breaking the selected entity, moving the selected entity, stretching the selected entity, or modifying a bendline.

17. The computer program of claim 11, in which the system performing the selected editing operation further comprises selecting a dimension of the sheet metal part model and modifying the dimension.

18. The computer program of claim 11, further comprising an operation manager object assigned to each sheet metal part model, the operation manager object including a list of editing operation performed on the sheet metal part model, the operation manager object pointing to the most recently performed editing operation, each newly created and executed editing operation having an ID that is added to the list after successful execution of the editing operation.

19. The computer program of claim 18, further comprising an undo system that undoes a previous editing operation by replacing a new entity of a sheet metal part model, which is assigned a unique ID number when the new entity is created by the previous editing operation, with an old entity and deleting the new entity from the sheet metal part model.

20. The computer program of claim 11, further comprising a snapping system that snaps an entity to a selected snap point by either angle or length.

21. A system for graphically editing a computer generated sheet metal part model, the system comprising:

a system that displays the sheet metal part model on a computer display screen;

a system that selects an entity of the sheet metal part model to edit;

a system that selects an editing operation to be performed on the selected entity;

a system that performs the selected editing operation on the selected entity;

a system that modifies the sheet metal part model in accordance with the performed editing operation; and a system that displays the modified sheet metal part model on the computer display screen, wherein a user views the modification of the sheet metal part model in real time.

* * * * *